INVENTOR
RICHARD H. SHAW
BY Charles A. Warren
ATTORNEY

United States Patent Office
3,714,018
Patented Jan. 30, 1973

3,714,018
ELECTRODE FOR ELECTROCHEMICAL DRILLING
Richard Horace Shaw, Hampden, Mass., assignor to United Aircraft Corporation, East Hartford, Conn.
Filed Apr. 5, 1971, Ser. No. 131,323
Int. Cl. B23p 1/02, 1/00
U.S. Cl. 204—284    2 Claims

ABSTRACT OF THE DISCLOSURE

An electrode for electrochemically drilling small diameter holes in which the electrode has a notch closely spaced from the tip with the dielectric coating on the electrode terminating in the notch and with the tip and notch specially shaped to prevent the action of the electrolyte during drilling from peeling off the coating.

The present invention relates to an electrode and the process of making an electrode for use in electrochemically drilling very small diameter holes.

BACKGROUND OF THE INVENTION

In electrochemically drilling small diameter holes, the electrode, in the form of a tube, must have a dielectric coating thereon to concentrate the electrical conduction between the electrode and the work at the tip thereof. The coating must be extremely thin, in very small diameter holes, and the outward flow of electrolyte between the tube and wall of the hole being drilled, tends to erode this coating and even to peel it off the tube.

The manufacture of these very small diameter electrode tubes presents problems because of the very small dimensions and the possibility of the coating, when being applied, entering the bore of the tube and closing it, making the electrode useless since the electrolyte must flow through the tube to reach the operative end of the tip.

SUMMARY OF THE INVENTION

One feature of the invention is a small diameter electrode for electrochemically drilling in which the tip is so shaped as to minimize the possibility of removal of the dielectric coating from the surface of the electrode during the drilling operation. Another feature is a method for making such an electrode so that it will be useable with the central bore fully open for the flow of electrolyte therethrough.

According to the invention the electrode, with a notch in its peripheral surface near the tip, is coated with a suitable dielectric after which the coating is removed from the tip back to the notch, thereby leaving a shielded edge for the dielectric coating at the notch. In making the electrode the tube is flattened at one end to close it and the notch is formed at a point spaced from the closed end. The dielectric coating is applied to the electrode from the closed end back for the necessary distance (which is greater than the depth of the hole to be drilled) and the closed end is then removed and the desired operative drilling tip is formed in such a way that the notch is closely spaced from the tip. During the formation of the tip the dielectric is removed from the outer surface back to the edge of the notch.

DESCRIPTION OF THE PREFERRED EMBODIMENT

Figure 1:
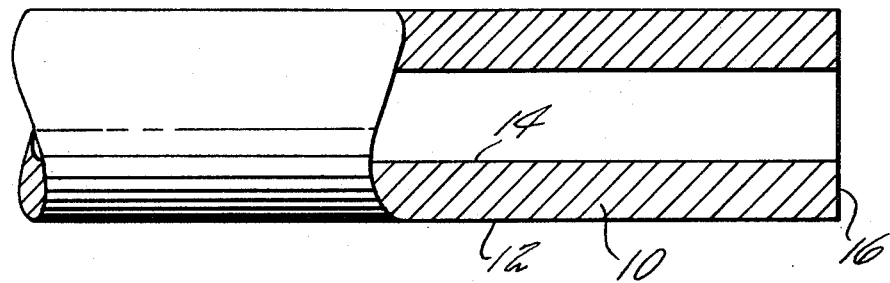
FIG. 1 is a longitudinal sectional view through the tube prior to the manufacture of the electrode.

Referring to FIG. 1 the tube 10 from which the electrode is formed is a suitable hard conductive alloy with a small outside diameter 12 and having a smooth bore 14 for the flow of electrolyte therethrough. The particular alloy used is a beryllium copper alloy and in the arrangement shown has an outside diameter of 14 mils (.014 inch) and an inside diameter of 6 mils. Such dimensions are exemplary and even smaller diameters are contemplated.

Figure 2:
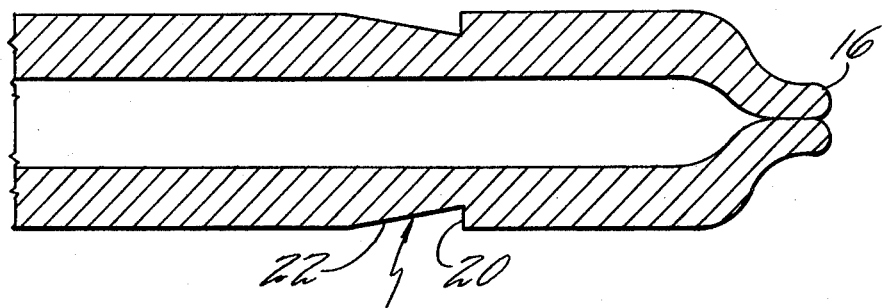
FIG. 2 shows the tube after certain manufacturing steps have been performed.

The tube has one end 16 crimped to close the bore as shown in FIG. 2 and a notch 18 is formed in the outer surface of the tube at a point spaced from the closed end. This notch has the surface 20 nearest to the closed tube end formed in a radial plane as shown and the other surface 22 extends at an acute angle to the outer tube surface and forms a notch that, in the partciular electrode shown may be from 1 to 2 mils deep, preferably 1.5 mils.

The tube end is then immersed for coating in a liquid dielectric material of the type described in the copending application of Joslin, Ser. No. 54,496 filed July 13, 1970, now U.S. Pat. 3,647,674. One satisfactory material is Parylene "C" which is a product of Union Carbide. This coating 24 is applied to a depth adequate to insulate the electrode from the wall of the hole to be drilled and a thickness of about .3 mil has been found to be acceptable. This coating as applied covers the end of the tube from the closed end back past the notch and far enough along the tube to provide a coating on the finished electrode for a length at least somewhat deeper than the hole to be drilled.

Figure 3:
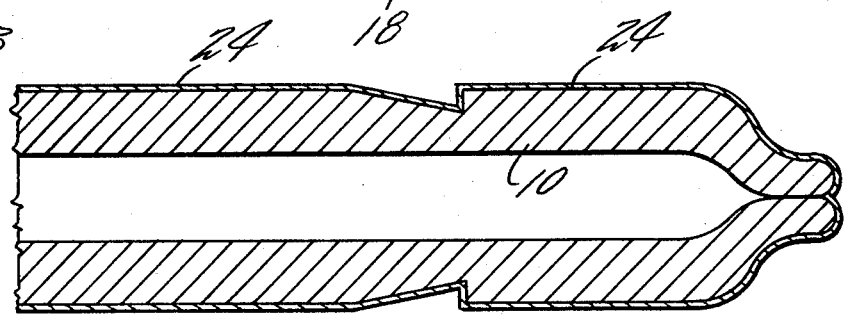
FIG. 3 shows the tube after additional manufacturing steps have been performed.
Figure 4:
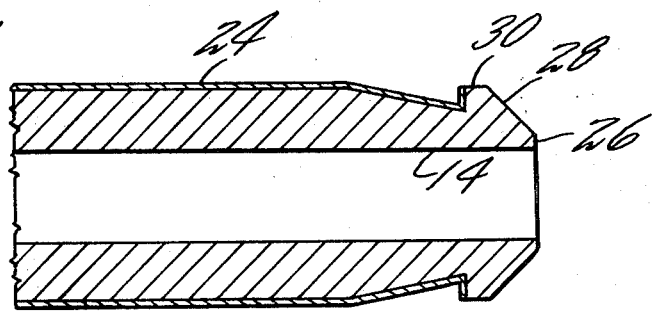
FIG. 4 shows the tube after the final manufacturing steps have been performed.

The tube is then in the configuration of FIG. 3 and is ready for the finishing operations to make the completed electrode. The next operation is to cut off the closed end at a point near to the notch and to remove the dielectric from the outer surface back to the notch as shown in FIG. 4. Thus the electrode tip has a flat end surface 26 in a radial plane extending radially outward from the bore 14 of the tube for a short distance which in the arrangement shown is about 1 to 1.3 mils. The remainder of the tip end extends at an angle of about 45 degrees to the longitudinal axis of the tube and forms a surface 28 sloping back from the end surface 26 and forming a cone which intersects the outer surface of the tube close to, but spaced from the notch 18 to leave a cylindrical tube surface 30 between surface 28 and the wall 20 of the notch. This surface 30 is preferably about 1.5 to 2 mils in axial dimension as shown.

The finished electrode tip, as shown in FIG. 4, thus has the dielectric coating extending from the notch along the tube surface for the necessary distance to accommodate the drilling depth requirements and the dielectric is protected at the tip end by the notch in the tube which serves to support the end edge of the dielectric in a position at right angles to the flow of electrolyte over the surface of the tube as it flows out the hole being drilled. This construction results from the dielectric being thinner (.0003 in.) than the depth of the notch (.0015 in.) so that the notch configuration exists in the finished tool and the coating lies flat on the right angled surface as shown in FIG. 4. At the same time since the tube end was closed during application of the coating, none of the coating could enter the bore and thus the bore is free of any obstruction that could obstruct the electrolyte flow during use of the electrode in a drilling operation.

What is claimed is:

1. A tool for use in electrochemical drilling including a metallic tube having a thin dielectric coating thereon, said tool having a tip from which the coating is removed and an annular notch extending around the tube adjacent to the tip to provide a smaller diameter portion, the coating extending into the notch, said notch having an oblique surface tapering toward the tip and intersecting a surface substantially at right angles to the axis of the tube, the notch being deeper than the thickness of the coating to leave a notch in the surface of the coated tool, and the tool tip including the periphery thereof beyond the notch being uncoated such that the tip is a smaller diameter than the tool back of the notch by the thickness of the coating.

2. A tool as in claim 1 in which the dielectric coating terminates at the outer edge of said right angle surface, the latter being the portion of the notch closest to the tip of the tool.

References Cited

UNITED STATES PATENTS

| | | | |
|---|---|---|---|
| 3,285,844 | 11/1966 | Hallsworth | 204—224 |
| 3,306,838 | 2/1967 | Johnson | 204—143 M |
| 3,498,904 | 3/1970 | Williams | 204—284 |
| 3,219,568 | 11/1965 | Wilkinson | 204—143 M |
| 3,547,798 | 12/1970 | Haggerty | 204—290 R |
| 3,594,298 | 7/1971 | Abt | 204—224 |

FOREIGN PATENTS

| | | | |
|---|---|---|---|
| 6,373 | 1968 | Japan | 204—143 M |

JOHN H. MACK, Primary Examiner

W. I. SOLOMON, Assistant Examiner

U.S. Cl. X.R.

204—129.55, 129.6, 224 M